Dec. 10, 1940.                H. R. HAWGOOD                2,224,817
                                MACHINE TOOL
                            Filed July 13, 1937            3 Sheets-Sheet 1

Harvey R. Hawgood  INVENTOR.
BY Hawgood and Van Horn
                   ATTORNEYS

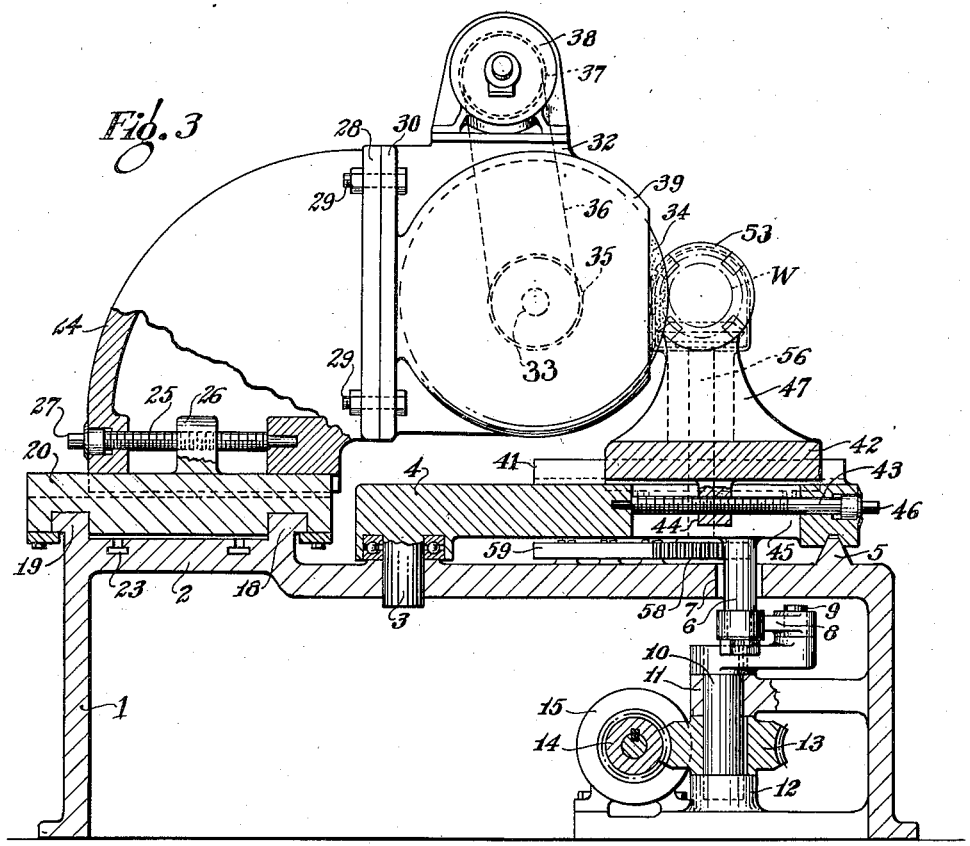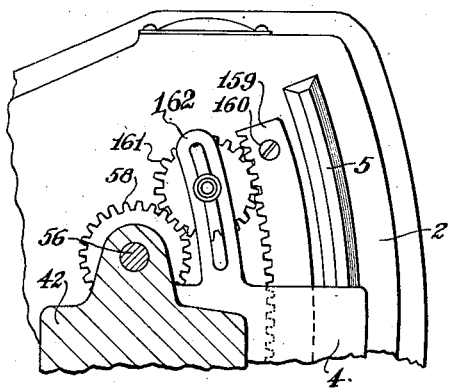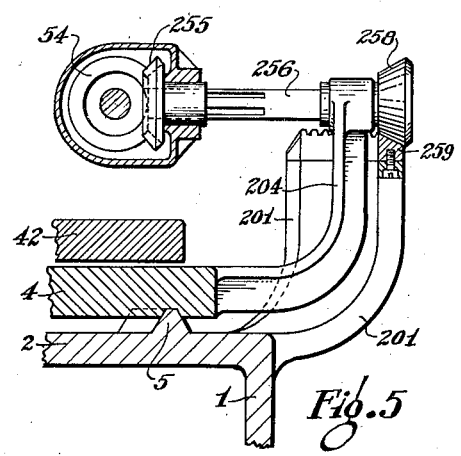

Patented Dec. 10, 1940

2,224,817

UNITED STATES PATENT OFFICE 2,224,817

MACHINE TOOL

Harvey R. Hawgood, Cleveland, Ohio, assignor to The Lees-Bradner Company, Cleveland, Ohio, a corporation of Ohio Application July 13, 1937, Serial No. 153,367

5 Claims. (Cl. 51—97)

This invention relates to machine tools, and is particlarly applicable to the formation of helico-spiral surfaces, such, for instance, as are present in worms of the enveloping type.

An object of the invention is to provide an improved machine tool which will accurately generate helico-spiral surfaces.

Another object is to provide an improved machine tool which will be simple in construction.

Another object is to provide an improved machine tool which will possess relatively few moving parts.

Another object is to provide an improved machine tool which may be easily adjusted and adapted to different sizes and forms of work.

Another object is to provide an improved machine tool which will be rapid in its operation.

Another object is to provide an improved method of forming curved surfaces.

Other objects will hereinafter appear.

The invention will be better understood from the description of several practical embodiments thereof illustrated in the accompanying drawings, in which;

Figure 3 is a vertical sectional view taken on the line III—III of Figure 2, parts being shown in elevation;

Figure 4 is a fragmentary plan view similar to a portion of Figure 2 and taken on the line IV—IV of Figure 1 of another embodiment of the invention;

Figure 5 is a fragmentary vertical sectional view taken in the position of the line V—V of Figure 2 of a third embodiment of the invention;

Figure 1:
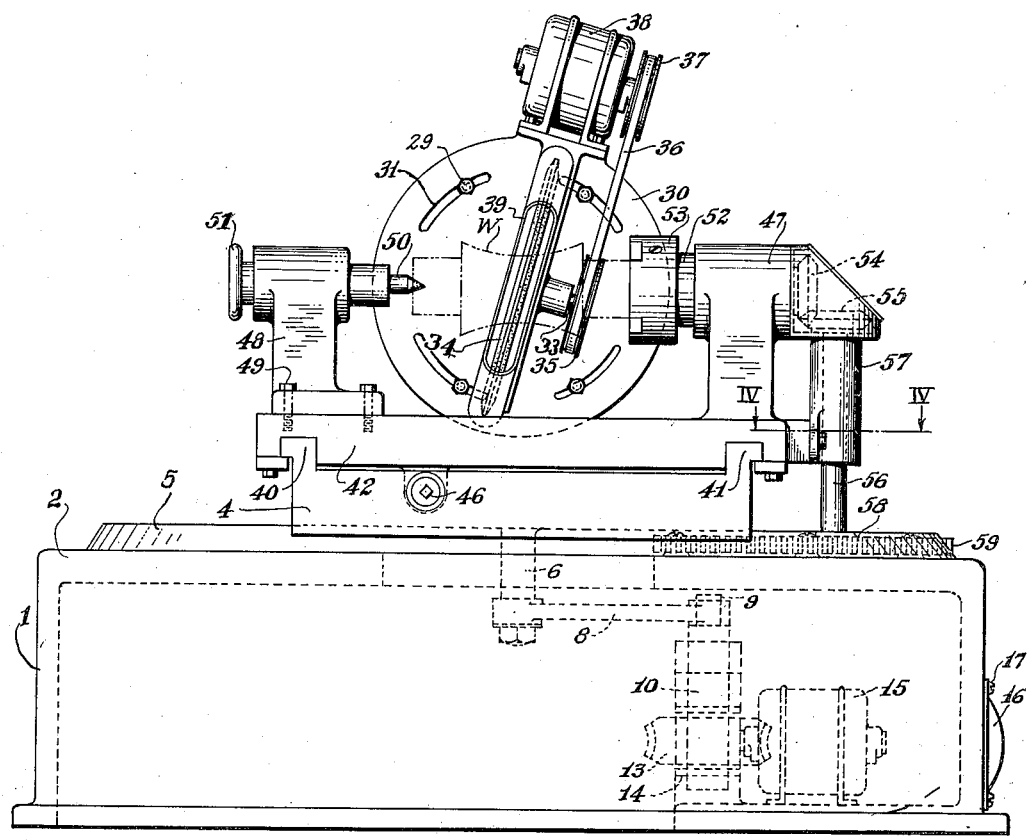
Figure 1 is a front elevational view of one type of machine designed for the production of the helico-spiral thread of an hourglass type of worm, such as commonly used in the steering mechanism of automotive vehicles.

In the first three figures of the drawings, a machine is shown comprising a base 1 provided on its upper surface with a generally horizontal top 2. Through the top 2 is formed an aperture for the reception of a depending pivot 3 formed integrally with the under side of an oscillatable generally horizontal table 4, the remote end of which is supported and guided in an arcuate path by ways 5 concentric with the pivot 3.

The table has, also formed integrally therewith, a depending arm 6, which passes through a slot 7 to the interior of the base. Upon the end of the arm is pivoted a connecting rod 8, its other end being pivoted to a crank pin 9 secured to a vertical shaft 10 journalled within bearings 11 and 12 inside the base. The shaft 10 also has keyed to it a worm wheel 13 which meshes with a worm 14 upon the shaft of an electric motor or other actuating device 15.

The motor is shown as situated within the base, and is readily accessible through a door 16 secured to the side thereof as by machine screws 17.

The parts immediately above described serve to oscillate the table upon ways 5 and about pivot 3, this oscillation being independent of the operation of the cutting tool or the like.

Two concentric ways 18 and 19 are formed upon the rearward part of the upper surface 2 of the base, the common center of these ways being at a point substantially forward of pivot 3 and approximately under the actual working portion of the cutting tool.

Adjustable upon these ways is a carrier 20 provided on its upper surface with ways 21. The carrier may be clamped in adjusted position by bolts 22 in arcuate slots 23 formed in the base top 2.

Upon the ways 21 is an upwardly extending bracket 24, movable horizontally by means of a screw 25 threaded through a boss 26 formed integrally with carriage 20 and rotatable in bearings within bracket 24. The projecting end of the screw is provided with a squared head 27 by which it may be rotated and move the bracket.

The upper end of the bracket has formed integrally therewith a circular flange 28 to which is secured, by bolts 29, a cutter supporting head consisting of a circular flange 30 having arcuate slots 31 through which the bolts 29 pass, and a projecting cutter support 32.

Mounted on a shaft 33 journalled within the support is a cutter, shown as a grinding wheel 34, although it will be apparent that other types of tools, such as toothed metal milling cutter or the like, might advantageously be used in working relatively soft material such as unhardened steel.

The shaft 33, on its outer end, is provided with a pulley 35 driven by a belt 36 passing around pulley 37 on the shaft of a motor 38 mounted upon the support 32.

A guard 39 is shown as surrounding grinding wheel being open only at the extreme forward side thereof to permit its engagement with the work.

The cutting surfaces of the wheel may be dressed to conical, involute, or any other desired form, and obviously two flat-faced wheels might be mounted on the head and set with their surfaces at any desired dihedral angle.

The upper surface of table 4 has formed thereon ways 40 and 41 upon which is adjustably supported a carriage 42. This carriage may be adjusted inwardly and outwardly by means of a screw 43 journalled in the table 4 and threaded through a depending lug 44 formed integral with the carriage, the lug being movable in a slot 45 through the table 4. The end of this screw is provided with a squared end 46 by which it may be adjusted.

Upon the top of carriage 42 is positioned a stationary headstock 47; in alinement therewith is a tailstock 48 adjustably secured to the carriage by machine screws 49. The tailstock is provided with a center 50 adjustable by means of a hand-wheel 51 or the like.

In the headstock is journalled a spindle 52, provided at its inner end with a chuck 53 and at its outer end with a beveled gear 54. The beveled gear meshes with a beveled gear 55 carried at the upper end of a vertical shaft 56 journalled in a bracket 57 rigidly fixed to the carriage 42.

The lower end of shaft 56 is provided with a gear 58 meshing with a gear segment or "curved rack" 59 concentric with pivot 3 and secured to the top 2 of the base by machine screws 60.

It will be apparent that as the table is oscillated by motor 15, gear 58 is caused to roll back and forth upon the gear segment 59. This motion is transmitted through the beveled gears 55 and 54 to the work spindle 52 and so to work blank W held by the chuck 53 of this spindle and partially supported by the center 50 of the tailstock.

Thus, the work is swung or oscillated in an arcuate path past the cutter 34, and is rotated in synchronism with this swinging motion, which causes the cutter to generate upon the work a generally helical surface of varying diameter from end to end of the work blank, and that this surface is that of a worm of the enveloping or hour-glass type. The dot and dash line indicated by the reference character W, of course, shows only the generally spool-shaped bounding surface of the work blank, prior to the time when the tool 34 has formed into it one or more helical grooves defining the helical surfaces just previously mentioned.

For the production of work pieces having differing diameters and leads, it is only necessary to adjust the head 32 to correspond to the lead, and to adjust bracket 24, carrier 20, and carriage 42, these adjustments compensating for any diameter of work and for any lengthwise curvature desired, as well as for the lead, and in addition to provide a suitable gear 58 and segment 59.

Of course, the positioning of segment 59 with relation to the axis of pivot 3 must bring the teeth of segmental part 59 to a given pitch circle described about the axis of pivot 3, and it will, therefore, be necessary with this form of apparatus to provide segments 59 of different widths for different adjustments of the carriage, as well as with teeth of a pitch corresponding to those of gear 58.

It will, of course, be obvious that the rack may be placed either between the gear which rolls upon it and the pivot 3, or on the opposite side of the gear 58, and that a rack on one side of the gear may be used in generating surfaces of pieces having a right hand thread and that on the other side for pieces having a left hand thread, or that when it is desired that the work turn in the oppostie direction, an idler may be interposed between the segment and the gear 58.

In Figure 4, an internal gear segment 159 is shown as substituted for the external segment 59 previously described. Upon this segment rolls an idler 161 adjustably carried in a slotted arm 162 made integral with or rigidly secured to table 4, and this idler in turn meshes with gear 58.

It will be apparent that, with a single gear 58 and with a single segment 159, a wide range of adjustments of carriage 42 upon table 4 is possible, as it will be unnecessary to replace the segment excepting when different sized teeth or pitches are required.

Figure 5 shows another arrangement which renders it unnecesary to exchange segments whenever adjustment is made in the position of the carriage. In this case, a beveled gear 255 meshes with the beveled gear 54 and is actuated by splined shaft 256 journalled in a bracket 204 fixed to the table 4.

The outer end of shaft 256 is provided with a beveled gear 258 meshing with a beveled gear segment 259 carried by brackets 201 fixed to the base 1, the segment 259 being concentric with pivot 3.

It will be apparent that as the carriage 42 is adjusted in and out upon its ways, gear 255 will merely slide upon the splines of the shaft 256 without changing the driving relation between gears 258 and 255.

Figure 6:
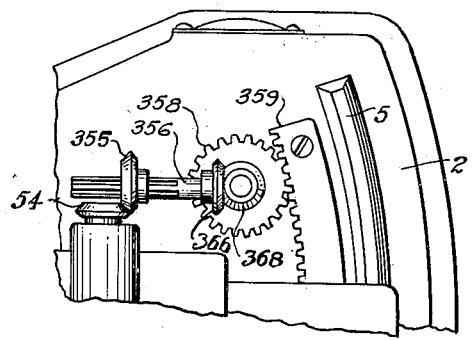
Figure 6 is a fragmentary plan view of another embodiment of the invention.

In Figure 6 is illustrated an embodiment of the invention in a device permitting the generating rack 359 to be maintained in a stationary position and engaged by a gear 358 which remains at a fixed distance from the pivot 3.

In this case the rack and gear are of conventional type, the axis of the gear being vertical and its shaft provided at its upper end with a beveled gear 368 meshing with a similar beveled gear 366 on the end of a splined shaft 356 having its axis parallel to ways 40 and 41. The shaft 356 engages splines within a beveled gear 355 meshing with the gear 54 of the work spindle.

As the slide 42 is adjusted inwardly and outwardly gear 355 slides upon the splined shaft 356, maintaining at all times positive rotative control of the work spindle by means of the engagement of gear 358 with rack 359. The vertical shaft connecting gear 358 with beveled gear and also gear 366 are carried by bearings (not shown) fixed upon the side of table 4.

Figure 7:
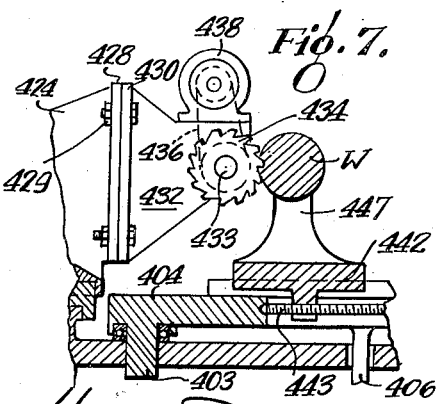
Figure 7 is a fragmentary vertical sectional view, similar to Figure 3, but showing the use of a metallic cutter instead of a grinding wheel.
Figure 2:
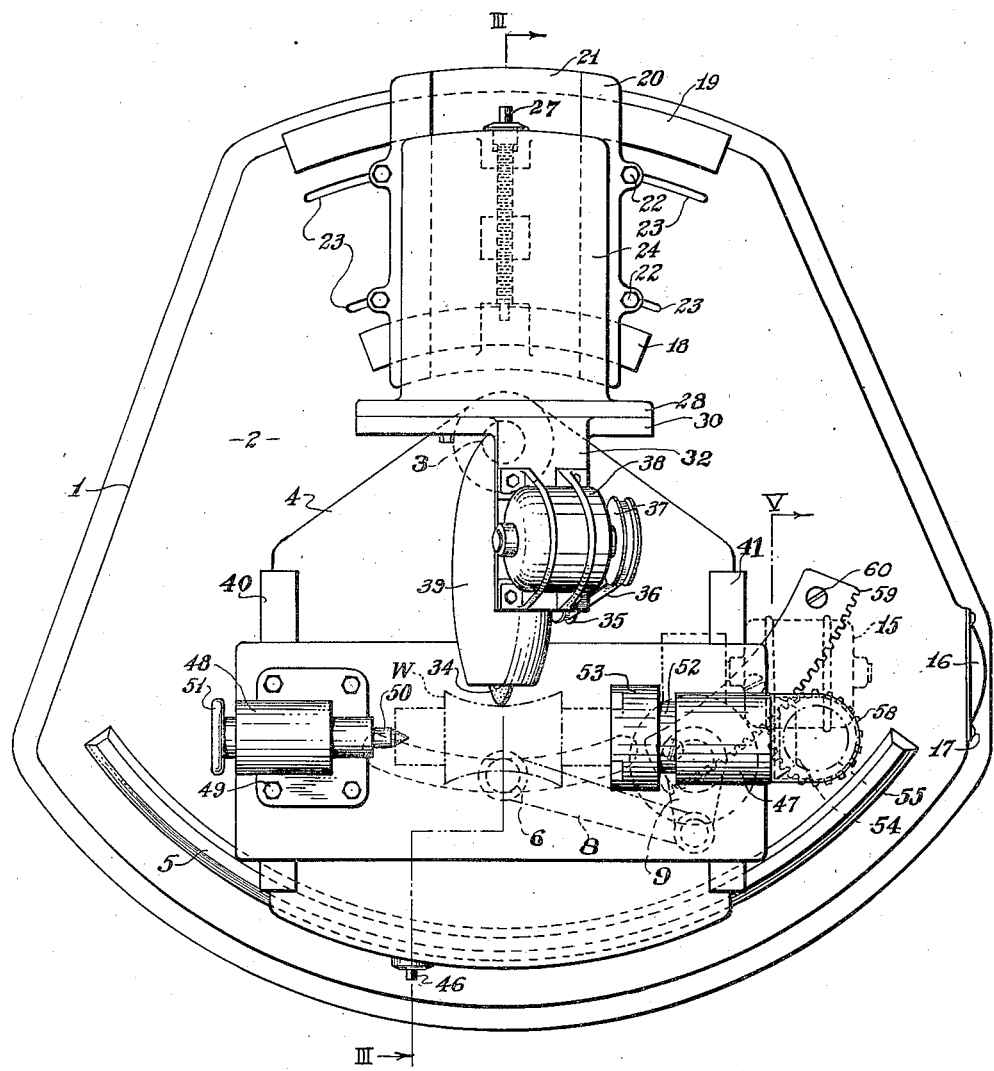
Figure 2 is a plan view of the machine of Figure 1.

Figure 7 resembles very closely Figure 3, showing the use of a circular metallic cutter 433, of the general type known as a milling cutter, in place of the grinding wheel of the first described embodiment of the invention.

The cutter 434 is mounted upon a spindle 433 journalled on the cutter support 432, which, except for the fact that it is shown as smaller than support 32 of the first few figures, is in all respects like this support and supported by mechanism precisely the same as above described.

The cutter is driven by a motor 438 through a belt 436 and is shown as operating on a work piece W, the relative motions of work and tool being similar to those described in conjunction with the grinding wheel above mentioned.

While the pivot 3 has been shown as extending beyond the cutting edge of wheel 34, it will be apparent that, if it were desired to produce barrel shaped objects instead of those of hourglass shape, the positions of the pivot and the ways 5 might readily be reversed.

So far as I am aware, in all machines for producing articles of the type herein referred to, rotation has been imparted to the work, while oscillatory movement has been imparted to the tool. This, particularly with large and heavy rotating tools such as grinding wheels, has rendered such machines unsatisfactory, as the oscillation of the wheel has probably been complicated by precessional effects and the like.

The present structure eliminates the possibility of such effects and, on the contrary, provides means for securely and rigidly supporting the wheel, together with its driving motor, limiting all rapid rotational movement to this relatively fixed assembly, while both the oscillation and the rotation of the work, both being relatively much slower, are easily imparted to the work.

The rotation of the work is directly related to its oscillation and is controlled by only two sets of intermeshing surfaces, namely; those of the gear 58 with the segment 59, and the teeth of the two beveled gears 54 and 55, thus reducing possibilities of error of looseness or backlash to a minimum.

While I have described the illustrated embodiments of my invention in some particularity, obviously many others will readily occur to those skilled in this art, and I do not therefore limit myself to the precise details shown and described herein, but claim as my invention all modifications, variations and embodiments coming within the scope of the appended claims.

I claim:

1. A machine of the character described comprising a base having a substantially horizontal upper surface, pivotal supporting means on the upper part of said base, ways concentric with said pivotal means, a table movable on said ways and supporting means, ways on said table arranged in a generally radial direction, a carriage carried on said ways, a horizontal spindle journalled on said carriage transversely of said radial ways, means depending from said table through said base, a source of power, connections between said source of power and said depending means for operating said table on said base, means for rotating said spindle as said carriage is moved comprising a gear train connected with said spindle and terminating in a gear movable with said table and a segment fixed to the upper surface of said base in mesh with said gear, a support adjustably carried by said base and angularly adjustable thereon, a longitudinally adjustable bracket upon said carrier, an angularly adjustable support carried by said bracket, a tool carried by said support, independent drive means therefor, and driving connections between said drive means and said tool.

2. A machine of the character described comprising a base, a normally stationary adjustable tool holder carried thereby, a rigid tool rotatably carried by said tool holder with its operating surface inclined with respect to the axis of the work and maintained in fixed position to operate within the bounding surface of the work, driving means connected to rotate said tool, pivotal supporting means on the upper part of said base, ways concentric with said pivotal means, a table movable on said ways and supporting means, ways on said table arranged in a generally radial direction with respect to said pivotal means, a carriage carried on said ways, a spindle journalled on said carriage, a second driving means, connections between said second driving means and said table, and means for rotating said spindle as said carriage is moved comprising a gear train connected with said spindle and terminating in a gear movable with said table and a segment fixed to said base in mesh with said gear, said gear train causing the work to rotate as the carriage is moved at a rate to form spaced convolutions in the work.

3. The method of producing helical surfaces and eliminating precessional effects which comprises rotating a tool about a fixed axis, the tool being rigid and having a working surface extending beyond the outer bounding surface of the work rotating a work blank about its own axis and simultaneously oscillating the work about an external axis lying in a plane normal to its axis and remote therefrom, maintaining the rotating of the work about its own axis and about said external axis in pre-determined convolution spacing correlation, and simultaneously traversing the work past the tool.

4. The method of producing helical surfaces and eliminating precessional effects which comprises rotating a tool about a fixed axis, the tool being rigid and having a working surface extending beyond the outer bounding surface of the work rotating a work blank about its own axis and simultaneously oscillating the work about an external axis lying in a plane normal to its axis and remote therefrom, maintaining the rotating of the work about its own axis and about said external axis in pre-determined convolution spacing correlation, and simultaneously traversing the work past the tool, the axis of the work and the axis about which the work is oscillated being spaced from the working surface of the tool.

5. The method of producing helical surfaces and eliminating precessional effects which comprises rotating a rigid tool about a fixed axis, rotating a work blank about its own axis, the working surface of the tool extending within the bounding surface of the work and simultaneously oscillating it about a third axis external thereto lying in a plane normal to its own axis and remote therefrom, both the motions of said work being in definite convolution spacing co-relation and independent of the rotation of the tool, and simultaneously causing the work to move past the tool to be operated on thereby.

HARVEY R. HAWGOOD.